March 3, 1931.    J. GLUCK ET AL    1,794,845
RECORD PRINTING METER
Filed March 1, 1926    6 Sheets-Sheet 5
*Fig. 12.*
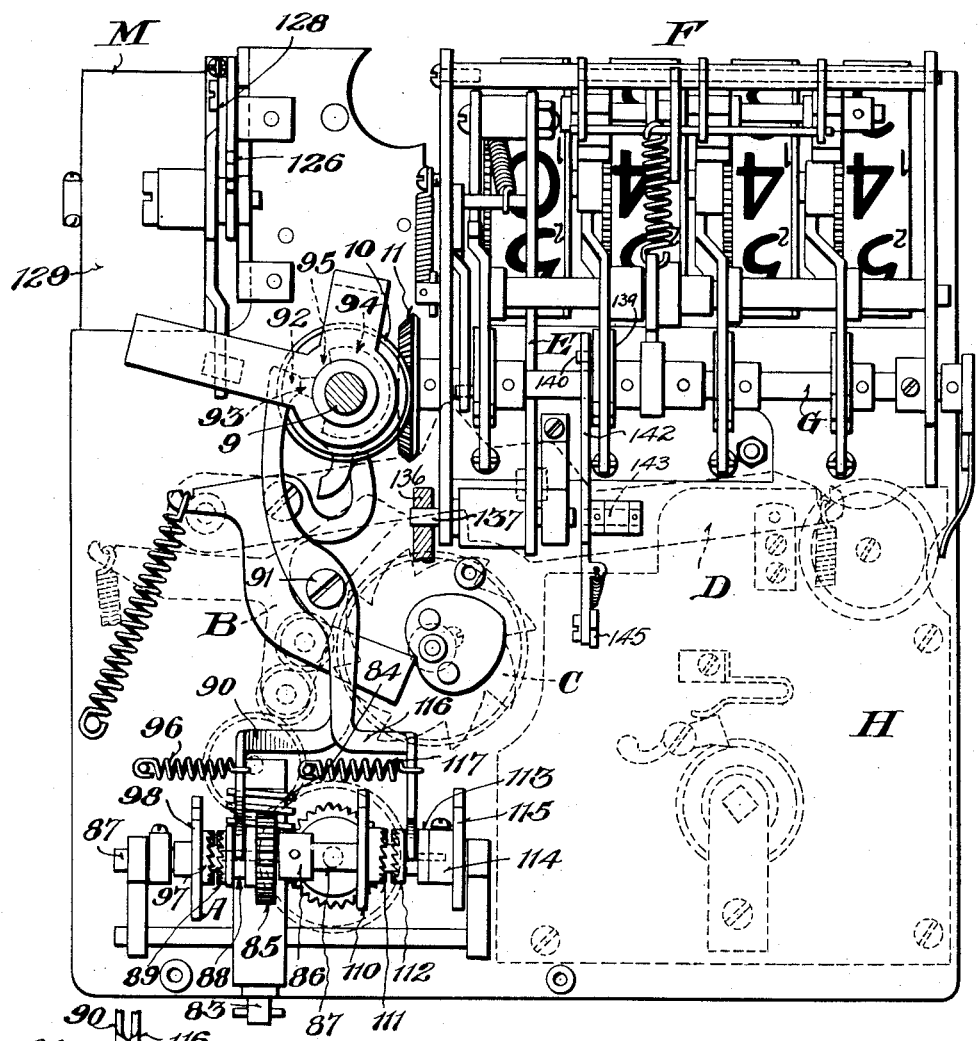
*Fig. 13.*
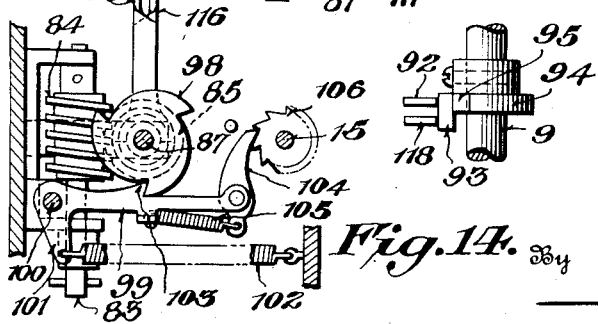
*Fig. 14.*
Inventors
Julius Gluck,
R. R. Karich,
By
Attorney

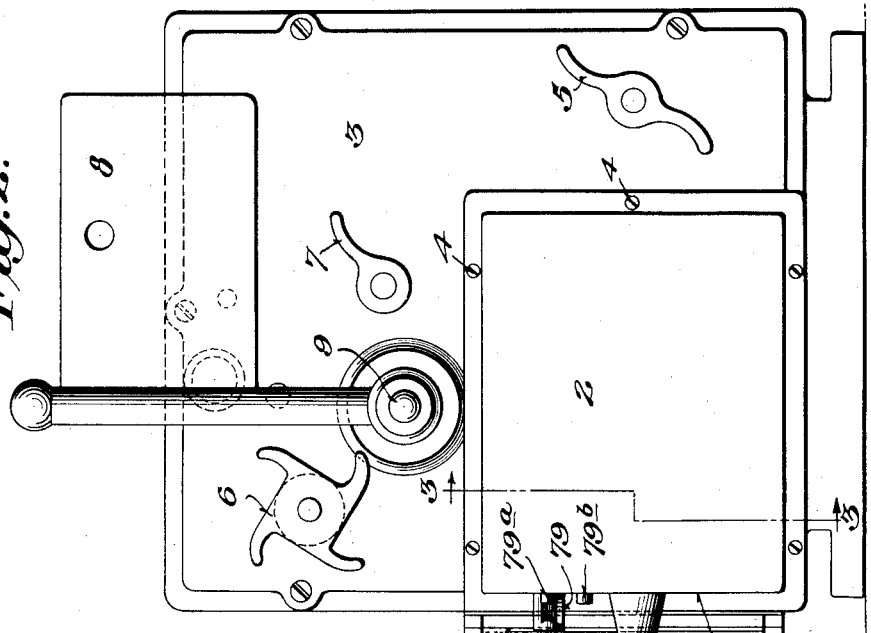

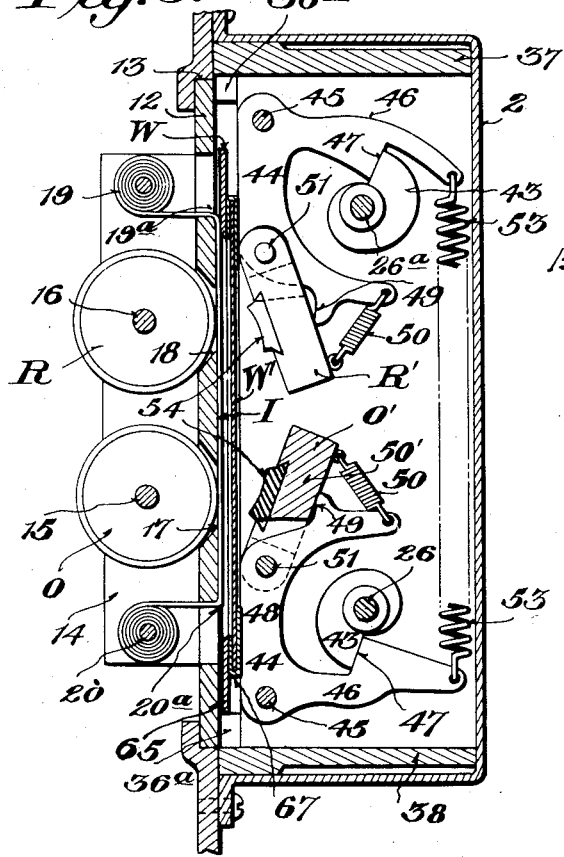

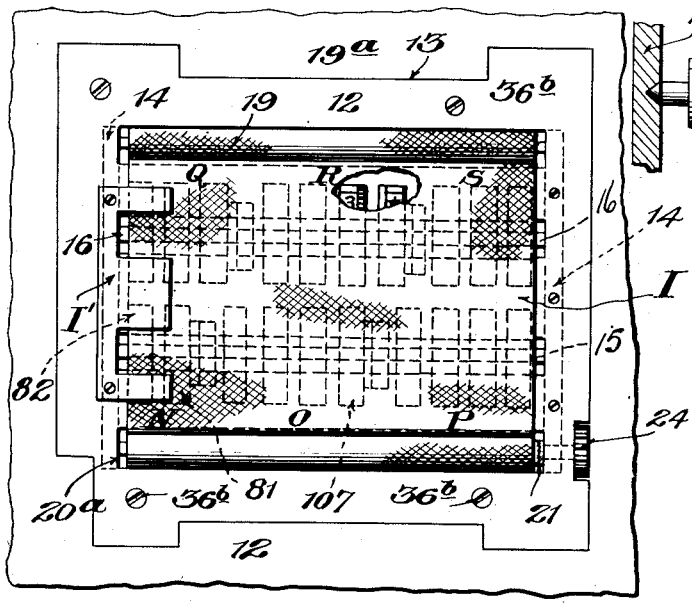
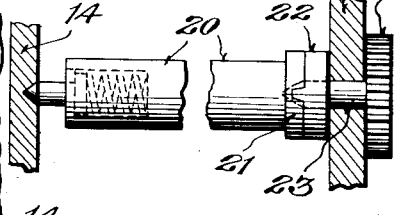
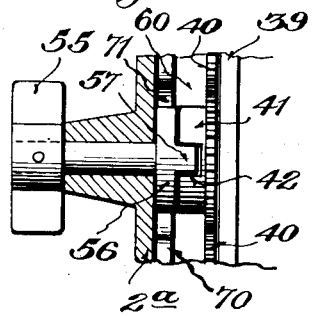
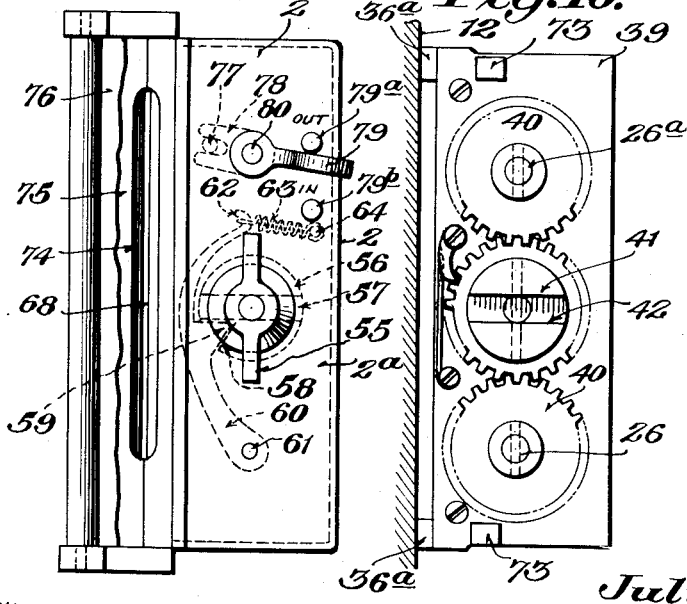
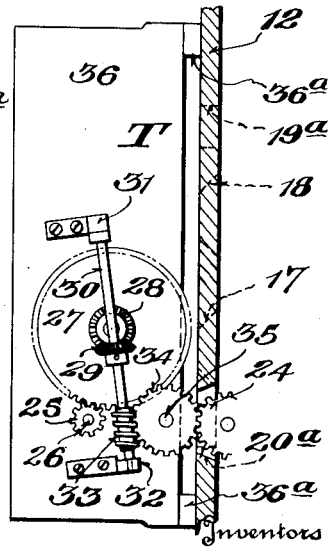

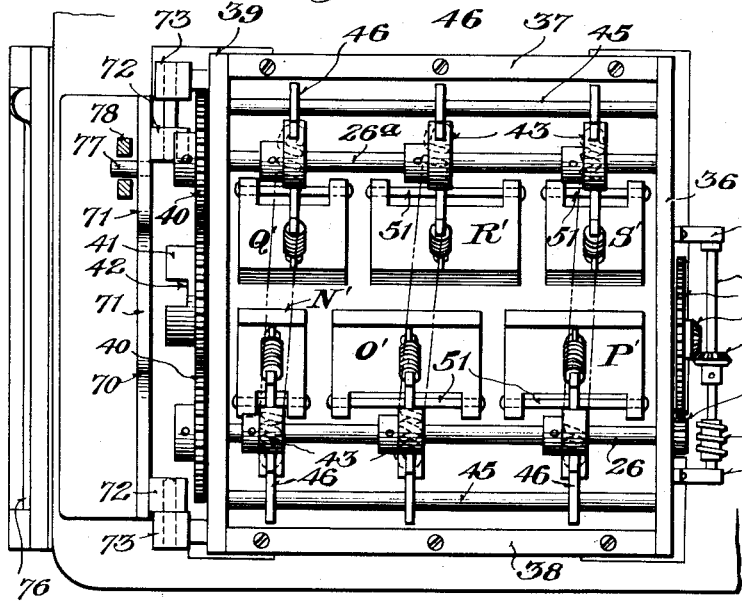
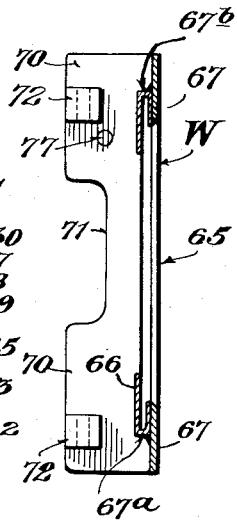

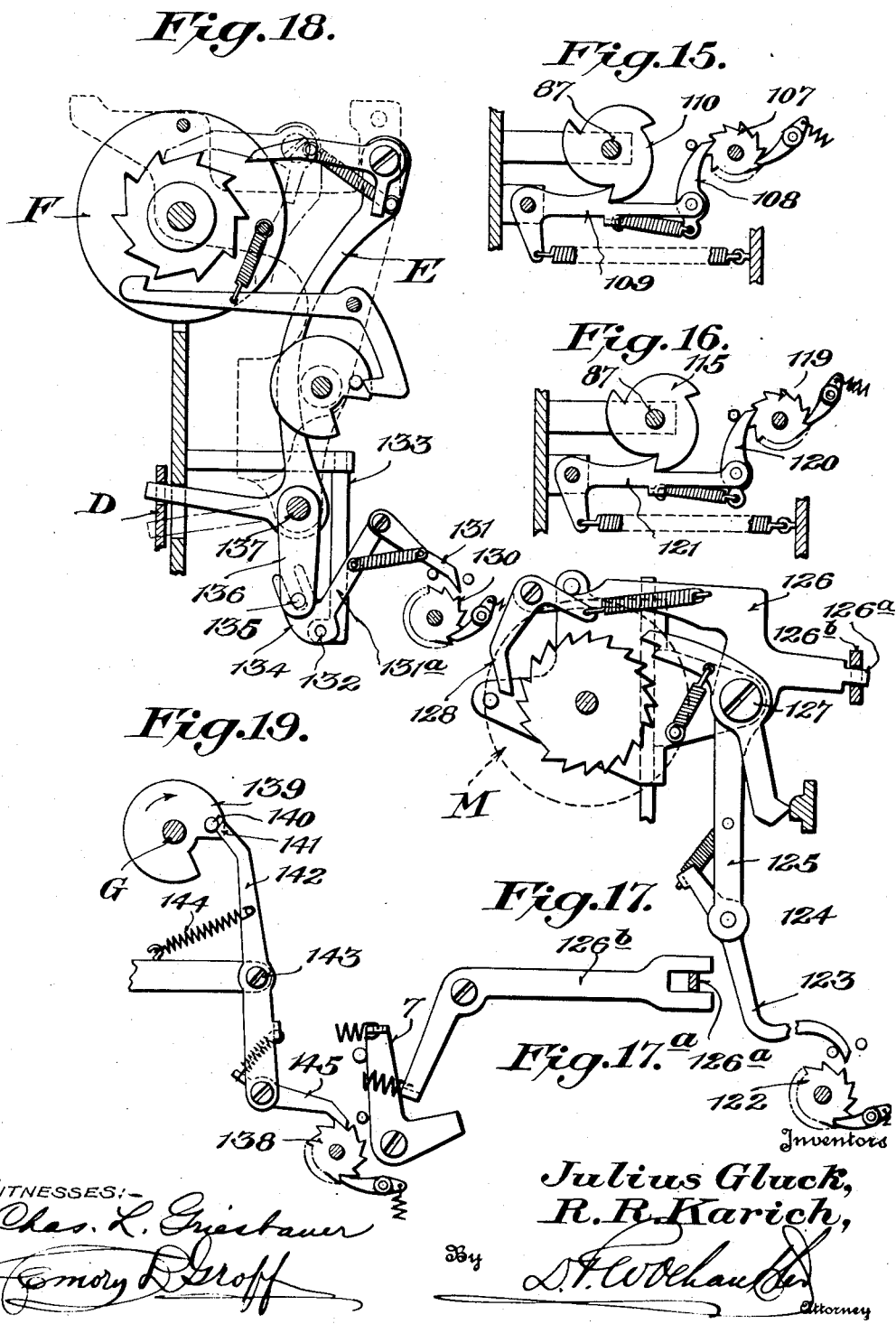

Patented Mar. 3, 1931

1,794,845

UNITED STATES PATENT OFFICE

JULIUS GLUCK AND RUDOLF R. KARICH, OF NEW YORK, N. Y., ASSIGNORS, BY MESNE ASSIGNMENTS, TO OHMER FARE REGISTER COMPANY, OF DAYTON, OHIO, A CORPORATION OF NEW YORK

RECORD-PRINTING METER

Application filed March 1, 1926. Serial No. 91,567.

This invention relates to taximeters, and more particularly to a taximeter of the record printing type.

To that end the invention contemplates a simple, practical and reliable meter construction adapted to print a novel record of the condition of the meter at the beginning and end of a working or earning period or at any time desired on a removable record medium, such for example as a card or the like, the printing being accomplished entirely independently of the flag. In record printing meters heretofore generally used the record has been made on a band, tape or strip of paper carried in the meter and moved or advanced by a part of the meter mechanism. In meters of this type, it is necessary for the cab owner or his agent to observe the various readings from the band, tape or strip, and then transfer the same onto another record or ledger sheet so that additional mathematical calculations can be made to arrive at the totals desired for checking purposes.

Accordingly, it is one of the primary objects of this invention to eliminate the objections above noted, and provide a record printing meter which will obviate the necessity of many of the operations now necessary in checking up individual cab operations. Therefore, it is proposed to provide a novel construction and arrangement of parts which permits of the insertion of a removable record form or card which will receive the readings from the type wheels in rows one above the other in the relation of a minuend and a subtrahend to permit and facilitate obtaining a remainder which will be a simple sum that will be the desired record, or a record that may be very easily translated on a chart provided on the card for that purpose. That is to say, the present invention contemplates a novel arrangement of the type wheels grouped in such a way, that with the aid of a simple and reliable shifting mechanism the record card may receive a row of figures to indicate the status of the meter at the time the cab started out on its run, and which will be a subtrahend; and later receive a second line of figures to indicate the status of the meter when the cab turns in after its run, this line of figures being a minuend. Thus, the record card does not receive a record of all trips of the cab during the day but only the totals, whenever desired, in such a way that they may be readily subtracted, thereby greatly facilitating the work of the checker and simplifying bookkeeping records of the cab owner.

One of the distinctive features of the invention is to depart from the practice of recording all of the operations of the meter, in series, on an endless record medium and provide a construction which will permit of the insertion of a card having previously printed indicia for receiving, in properly designated spaces, the readings from the type wheel units actuated by the different instrumentalities of the meter, thereby to record in properly identified spaces such items as "paid mileage", "total mileage", "extras", "units", "trips", and the so-called "detector mileage", thus making a record that is easily identified and simple to read by unskilled persons.

Another object of the invention is to provide a printing mechanism including special impression means possessing features of construction which make its operation positive, accurate, and beyond possibility of changing or tampering by the driver, thereby providing an extremely effective and safe record for both the driver and the cab owner. A distinctive feature of the impression mechanism is that it strikes the record card against the type wheels with a quick sharp thrust, thereby obtaining a clear record even when a card of relatively stiff material is used.

A further object of the invention is to provide a construction which permits the use of a card having a chart adapted to receive the identification of the cab, driver, the extras at the prescribed rate, and the various totals heretofore referred to.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which Figure 1 is a side elevation of a meter embodying the present improvements.

Figure 2 is a rear view of the meter shown in Fig. 1.

Figure 3 is an enlarged vertical sectional view taken on the line 3—3 of Fig. 2.

Figure 4 is a detail elevation of the frame carrying the printing type-wheel units mounted in the back plate of the meter.

Figure 5 is an enlarged detail view of a part of the feeding means for the inked ribbon.

Figure 6 is a rear elevation of the impression means, also showing the card holder in position, the view corresponding to Fig. 3 with the cover removed.

Figure 7 is a perspective view of the shiftable card holder.

Figure 8 is a vertical sectional view taken on the line 8—8 of Fig. 7.

Figure 9 is an enlarged side elevation of the printing unit.

Figure 9$^a$ is a detail sectional view of the impression means actuator.

Figure 10 is a side elevation of the frame of the impression means which engages with the actuating means on the cover shown partly in dotted lines in Fig. 9.

Figure 11 is a side elevation of the opposite end of the frame of the impression means shown in Fig. 10 and illustrating the means for moving the inked ribbon, the same showing how the driving means engages with the gear on the ribbon feeding roller.

Figure 12 is a rear elevation of the main plate of the meter showing the general arrangement of the instrumentalities for operating the several type wheel units.

Figure 13 is a detail view of the cam for controlling the "detector mileage" lever and the "paid miles" clutch lever.

Figure 14 is a detail side elevation of the driving means.

Figure 15 is a detail view illustrating the means for operating the "paid mileage" type wheel unit.

Figure 16 is a view similar to Fig. 15 showing the means for operating the "total mileage" type wheel unit.

Figure 17 is a view illustrating the means for operating the "extras" type wheel unit.

Figure 17$^a$ is a detail view of the means for operating the extras lever.

Figure 18 is a detail view illustrating the means for operating the so-called "units" type wheels.

Figure 19 is a detail view illustrating the means for operating the "trip" type wheel unit.

Figure 20 is a view of the record card.

Figure 21 is an enlarged detail view of one set of the printing type wheels.

Similar reference characters designate corresponding parts throughout the several figures of the drawings.

In carrying the present invention into effect it is proposed to provide a record printing taximeter which is adapted to use standardized meter parts and units, thereby greatly enhancing the value of the invention from a manufacturing and commercial standpoint both as to economy in initial cost and maintenance.

In record meters heretofore used the records obtained were merely tabulated readings recorded at certain intervals during the operation of the machine, usually at the end of each complete operation or cycle of the flag shaft. As previously set forth, records resulting from a meter construction of this type are more or less complicated not only because of the multiplicity of readings recorded on the record medium but also because the readings represent fractional parts of a mile or a multiplicity of intermediate operations with which the cab owner is seldom, if ever, concerned.

Furthermore, record printing meters of the type referred to, aside from the tediousness of deciphering the meaning of the records registered, require much time and attention in dispatching cabs from a garage, and, therefore, the present invention has in view a construction which will greatly facilitate dispatching and checking of the meter readings by the garage superintendent.

In practice, the record card is inserted at the time the cab goes out of the garage so that the reading of the various type wheel units may be obtained when the cab starts out, and this card is then removed and preserved in a file or other place at the garage until the cab returns from its "run" or earning period. The card is then re-inserted in the printing unit and a second record taken in such a way that two rows or lines of figures are provided to permit of the lower line of figures being subtracted from the upper figures to give the totals by a simple subtraction method, thereby indicating readily what may be expected of the driver in the way of returns, or how he has handled the cab while the same has been in his charge.

By the use of the present invention the record medium is of course, not kept in the meter, and therefore it is impossible for the same to be tampered with by the driver, and if desired, by printing duplicate cards at the time the driver starts out, one of them may be handed to the driver and the other kept at the garage, whereby it will not only be possible for the driver to see exactly what the state of his meter was at the time he left the garage, but also he, as well as the checker, at the garage can determine exactly what the state of the meter is when the cab is returned by inserting the cards and taking another reading. In that way disputes between drivers and cab owners or checkers are avoided and consequently former difficulties in that connection are not encountered.

The present construction is particularly adapted for use in connection with the taximeter construction described and claimed in our co-pending application filed of even date herewith, and therefore so far as the details of the general meter construction is concerned, reference may be had to that application.

However, by reference to the accompanying drawings, it will be observed that all of the essential units and connecting instrumentalities are shown to more readily understand the operation and functioning of the present construction.

Accordingly, it will be observed from Fig. 1 that the present meter includes in its general organization a main casing 1 having at the rear thereof the novel printing unit, hereinafter more fully referred to, and enclosed in the cover 2. That is to say, the main meter casing 1 is fitted to the front side of the back plate 3 so as to cover the meter construction in general while the cover 2 is fitted to the rear side thereof by removable fastenings 4 or their equivalent so that by removing the cover 2 access may be readily had to the impression means, and the other parts of the printing mechanism.

With further reference to Figs. 1 and 2 it will be observed that the back of the meter is provided with the clock winding key 5, the flag-lock control-knob 6, the extras knob 7 and the so-called flag 8 mounted upon a flag shaft 9 journaled in the back of the meter.

Referring generally to the interior meter construction (Fig. 12) it may be pointed out that the same includes driving means designated generally as A and a distance clutch device B under the control of the flag shaft 9 thereby to connect the driving means A with the star wheel unit designated generally as C. A time clutch (not shown) is also used to connect the clock with the star wheel unit. The said star wheel unit C operates the fare drum actuating means which includes the levers D and E, known as the "drop levers" which operate the counter of lowest value of the fare drum unit designated generally as F. Thus, the fare drums or counters of the unit F are operated by the levers D and E, and the resetting of said drums back to normal position is effected by instrumentalities controlled by the main cam-shaft G which in turn is under the direct control of the flag shaft 9 by the intermeshing bevel gears 10 and 11. The main cam shaft G makes one complete cycle each time the flag shaft 9 makes a complete cycle, and therefore it is utilized to actuate the trip-printing type wheel unit, as will presently appear.

The star wheel unit C is adapted to be operated by the clock work H, at a differential rate, as shown and described in our co-pending application Serial No. 68,686, filed November 12, 1925. Therefore, the "units" type wheels will correctly register the number of times the lever E is actuated according to whether the cab is traveling or waiting and the meter mechanism being driven by the clock.

The extras mechanism for registering the increments of extra fare to be charged the passenger for baggage etc. may be observed in Figs. 12, 17 and 17ª wherein the same is designated generally as M, and includes as a part thereof the extras knob 7 on the back of the meter, previously referred to. Each time an "extra" fare is registered on the face of the meter it will show up on the extras printing type wheel unit so that the number of extras rung up by the driver can be readily ascertained on the record card.

*General description of printing means*

As previously indicated, the record card printing instrumentalities are placed at the back of the meter, and for convenience in manufacture and assembly, the construction is such that the entire printing mechanism and impression means may be readily mounted and dismounted, and to that end, the various type wheel printing units are preferably mounted or carried in a frame which is removably mounted in the back plate 3.

Although the printing type wheel units may be of any desired number and arrangement, in the present instance six type wheel units are used, and by reference to Fig. 4 of the drawings it will be observed that these units are respectively designated as "N", "O", "P", "Q", "R", "S", all of which are mounted in the type wheel carrying frame which includes the plate or body 12.

The type wheel unit N is known as the "detector mileage" printing unit which prints the so-called "detector mileage" or mileage that the cab registers when the driver has the flag in an improper position. The type wheel unit O registers the "paid mileage"; the type wheel unit P registers the "total mileage"; the type wheel unit Q registers the "extras", that is, the number of times that the extras fare indicating drum is pushed forward to indicate an additional unit of charge. The type wheel unit R registers the so-called "units" or the number of times that the drop lever D—E moves forward to operate the fare drum of lowest value, and the type wheel unit S registers the number of trips for which the cab has been hired, or in other words each time that the flag moves through a complete cycle, the "trips" type wheel unit moves forward or advances one numeral.

The type wheel units N, O, P, Q, R, S are aranged in upper and lower groups, the lower group comprising the units N, O, P, and the upper group comprises the units Q, R, S, and therefore the numerals from the position of Fig. 4 will be upside down as well as backwards (see Fig. 21) so that when the record card is inserted with the upper edge down and a record taken from the type wheels, the record on the card will appear in the usual reading order, when held in the hand.

The plate-like body 12 which carries the type wheel units is preferably set into the back plate of the meter as indicated at 13, and is provided with the inwardly projecting wings or side members 14 that carry the transverse shafts 15 and 16 upon which the lower type wheel units N, O, P and upper type wheel units Q, R, S are respectively mounted. (See Figs. 3 and 6). Also the body plate 12 is provided with the slots 17 and 18 which expose the alined embossed numerals on the type wheel units which provide the rows of numerals from which the record is to be taken.

Inked ribbon

The inked ribbon for causing the impressions to be taken from the type wheel units is designated as I, and is carried on the upper supply roller 19 mounted near the top of the wings 14. The ribbon passes over the face of the plate 12 and across the slots 17 and 18 and onto receiving and feeding roller 20 which is mounted near the bottom of the said wings. In practice, the inked ribbon from the supply roller 19 is threaded through the slot 19$^a$ across the plate and thence through the slot 20$^a$ at the bottom of the frame. The receiving and feeding roller 20 is provided at one end with a clutch member 21, (see Fig. 5) operating in conjunction with a complemental clutch member 22 carried by a shaft 23 which carries the gear 24.

The gear 24 which operates the inked ribbon receiving roller 20 through the clutch 21—22 is actuated at a low rate of speed by a suitable train of gearing carried by one of the sides 36 of the impression unit designated generally as T (see Fig. 11). This train of gearing includes a pinion 25 mounted on the lower cam shaft 26 of the impression mechanism, and in turn meshing with a relatively large gear 27 journaled on the outer face of 36. This gear 27 is provided with a centrally located bevel gear 28 which meshes with a bevel gear 29 carried by a worm shaft 30 journaled as at 31 and 32 in bearings carried by 36. Also the shaft 30 is provided with a worm 33 which drives a gear 34 mounted as at 35 on the side of 36 in such a way that its teeth may readily mesh with the gear 24 of the inked ribbon advancing means. All of the gearing referred to is carried by the side member 36 of the impression means T removably fitted to the frame 12, and spaced therefrom by the spacing members 36$^a$. Thus, since the gear 24 is carried by the plate 12, it will be apparent that the gears 34 and 24 may be made to mesh by the mere placing of the impression unit in position, and likewise the removal of the impression unit will disconnect the gears.

To prevent the record card engaging the side of the ribbon when it is inserted a guard I' is provided as shown in Fig. 4.

The impression means

The impression means preferably comprises a rectangular frame including the side member 36 previously referred to, the top and bottom members 37 and 38 (see Fig. 6) and the opposite side member 39.

Between the side members 38 and 39 the lower cam shaft 26 previously referred to is journaled and also near the upper ends of said members a second cam shaft 26$^a$ is mounted. These cam shafts have at their outer ends the driving gears 40—40 which are driven by a common intermediate actuating gear 41 having a hub portion provided with a key slot 42. When the intermediate gear 41 is rotated it will be apparent that the gears 40—40 will be rotated, thereby operating the cam shafts 26 and 26$^a$. These cam shafts are provided with a plurality of cams 43 for operating individual impression platens for each of the type wheel units.

The impression mechanism which includes the parts so far described, and the means for taking the readings from the type wheels is one of the novel and distinctive features of the present invention in the respect that the means designed for impressing the record card against the type wheels operates in an entirely new and novel way to obtain the desired impact between the record card and the type wheels, the inked ribbon intervening, of course, to color the impression obtained from the type wheels.

The impression platens for striking the card against the type wheels, are of sufficient width or length to take the impression from as many type wheels as there are in each unit. For example, it will be observed that the platen N' is of sufficient width to take the impression from the two type wheels of the detector mileage unit N, the platen O' is of sufficient width to take the impression from the four type wheels of the paid mileage unit O'; the platen P' is of sufficient width to take impressions from the four type wheels of the total mileage unit P; the extras platen Q' is of sufficient width to take a reading from the three type wheels of the extras unit Q; while the units platen R' will take care of the four type wheels of the "units" set; and likewise the platen S' is wide enough to take care of the three type wheels of the "trip" unit S.

The cam shafts 26 and 26$^a$ carry thereon the cams 43 and as will be observed from Fig. 3 the said cams are set so that all of the various impression platens will strike against the alined figures of the type wheel units simultaneously to record all of the readings registered by said type wheels.

As the individual structural features and characteristics of each one of the percussive impression units are the same, a description of one will suffice for the other. Therefore, by reference to Fig. 3 it will be observed that the means for supporting and operating the platens includes an angular lever 44 pivotally supported on the shaft 45 and having the arm 46 thereof provided with the nose 47 adapted to be engaged by cam 43. The other arm 48 of the lever is curved backwardly over the cam and is formed with a platen abutment shoulder 49 against which the platen O', for example, is held by means of the spring 50, the said spring having one end anchored to the platen and the other end secured to the outer portion of the arm 48 as shown in Fig. 3. The platen O', which has been chosen for an example, is pivotally mounted on the arm 48 by means of the pintle 51 as will be clearly apparent from Fig. 3. The arms 46 of the levers 44 of the upper and lower impression units are connected by the relatively stout springs 53 so that for the six impression units only three springs are necessary to draw the arms 46 into engagement with the cams 43 so that when the cam shafts 26 and 26ª are operated, the cams 43 will push the arms 46 of the levers 44 against the tension of the said springs 53.

The platen members may be made of any suitable and desirable material, but are preferably provided with a relatively soft or yielding offset striking surface 54 which conforms to the curvature of the type wheels thereby to take off an accurate impression. In operation, when the shafts 26 and 26ª are rotated the cams 43 thereof engage with the cam abutments 47 of the levers 44 and rock said levers backwardly on their axes 45 until the cam abutments 47 drop off of the zenith of the cams 43. When the levers 44 are thrust back to the position shown in Fig. 3, due to the cooperation of the cams 43 and 47 just described and the action of the springs 53, the platens thereof are thrust forwardly, away from the abutments 49 against the tension of the springs 50 so that the curved surfaces 54 thereof press the interposed record card against the type wheels. As the platens move forward on their hinge pintles 51 it will be appparent that they move forward a greater distance than the arm 48 of the lever 44 due to the momentum acquired by the sudden thrusting forward of lever 44 upon the disengagement of the cams 43 and 47 and the tension of the springs 53. After the striking of the record card to push it against the type wheels, the springs 50 pull the platens back against the abutments 49 so that they are held out of the way; will not rattle; and cannot move forward until the lever 44 is again rocked by its corresponding cam.

The gear arrangement for operating the cam shafts 26 and 26ª has been previously described, and before proceeding to a description of the means for operating the impression mechanism it may be noted again that the shaft 26 carries the gear 25 which operates the inked ribbon feeding means. As the shaft 26 only makes one revolution at the time the record card is printed, and ordinarily the record cards are printed only when the cab starts out, and then again when it returns from its run, it will be seen that the gear 25 imparts only a slight movement to the gear 24 on account of the intervening reducing mechanism.

The cover 2 which houses and conceals the impression mechanism carries on the inner face of one of its sides, namely the side 2ª, an operating handle or knob 55 which may be in the form of a winged key as shown in Figs. 1, 9 and 9ª or its equivalent, the same being journaled in the side wall 2ª as shown in Figs. 9 and 9ª. The knob 55 carries at the inner side thereof a tenon disk 56 having the offset tenon portion 57 adapted to register with the mortised slot 42 of the gear 41 so that when the key 55 is turned, the gearing 40—41 for operating the shafts 26 and 26ª will be actuated.

In connection with the arrangement of the slot 42 and the tenon 57 it will be seen from Figs. 9 and 9ª that the same are arranged so that the cover 2 may be readily moved horizontally into position, and, to insure the tenon 57 always returning to its horizontal position at the end of each cycle, suitable check means are provided. In the embodiment shown this means consists of a keeper notch 58 formed in the disk 56 adapted to be engaged by the keeper projection 59 of a lever 60 pivotally supported as at 61 on the inside face of the wall 2ª and extending upwardly around the disk 56 as shown in Fig. 9. The upper end of the lever 60 is formed with a hook portion 62 for receiving a spring 63 anchored to a stud 64 on the inner face of the wall 2ª.

*Record card holder*

One of the distinctive features of the present invention is a shiftable record card holder adapted to position the records in the proper relation for expeditious totalizing.

As shown in Fig. 7 the record card holder designated generally as W is arranged between the impression mechanism and the inked ribbon I overlying the exposed figures of the several type wheel units. Figs. 3 and 6 further illustrate the relation of the record card holder to the impression mechanism, and also the details of construction thereof. By reference to Fig. 7 it will be observed that the holder W includes a body portion 65 provided with a window 66 and a card receiving guideway 67 which is open at the end 68 to receive a card W' of the type shown in Fig. 20. The end of the guideway 67 is preferably closed at 69 to provide an abutment for the leading edge of the card so that it will be correctly positioned with reference to the type wheel units.

The body 65 may be formed in various ways to provide the guideway 67, but as shown in Fig. 8 the bottom edge thereof may be formed by a U-shaped member 67$a$ which affords a smooth unobstructed surface over which the card may pass, while the upper edge may be formed in a similar manner by the inverted U-shaped member 67$^b$.

A wing 70 is offset at right angles from the body 65, and is recessed at 71 to clear the tenon disk 56 which engages the slotted hub of the gear 41. Also this wing carries on its inner face a pair of spaced abutment lugs 72 which lie between and are adapted to strike against the stop portions 73 carried by the side member 39 of the frame of the impression means. As will be observed from Fig. 3 for example, the body 65 of the record card holder is arranged in the space provided by the spacers 36$^a$ at the front edges of the side members 36 and 39 of the rectangular frame of the impression unit in such a way that the said body may be moved up and down between the frame of the impression means and the plate 12 a distance equal to the space between the pairs of stop members 72 and 73. That is to say, the arrangement is such that the entire record card holder W may be shifted up and down between the impression means and the type wheel units so that two lines or rows of type may be printed on the record card W'.

As stated, the position of the numerals of the type wheels is relatively upside down as well as backwards in order to obtain a record reading in the usual order on the record card. To carry out that object, the card W' preferably having printed thereon the indicia shown in Fig. 20, is inserted upside down into the guiding mouth 74 of the card receiving face plate 75 on the outside of the casing. The card receiving mouth 74 registers with the entrance end 68 of the guideway 67, and the said mouth 74 is of sufficient length to accommodate the necessary edgewise movement of the card.

To cover and protect the card receiving mouth 74 (Fig. 9) a spring-pressed guard plate 76 (Figs. 1 and 9) is provided.

In order to effect the shifting of the card to print lower and upper lines of figures suitable means for shifting the entire card record holder is provided.

As will be observed from Figs. 6, 7, 8 and 9, the wing 70 of the record card holder is provided on the side opposite the stop abutment 72 with a stud 77 adapted to be engaged by the forked end 78 of a shifter lever 79 which is pivoted to the wall 2$^a$ as shown at 80 in Fig. 9. By shifting the lever 79 from one side to the other until it strikes the limiting stop 79$^a$ and 79$^b$ respectively marked "Out" and "In" the record card will be moved in position to receive a line of printing from the type wheels according to whether the cab is going out on its run or is returning.

For example, when the lever 79 is moved to the position shown in Fig. 9, namely in contact with the post 79$^a$ labeled "Out", the card W' of Fig. 20 will be positioned to receive the lower line of figures W$^2$. After the impression means has been operated to print the line of figures W$^2$ the card W' is removed from the meter and held by the "checker" or garage superintendent until the cab returns. The card having the line of figures W$^2$ thereon is again inserted into the card holder and the lever 79 shifted in engagement with the post 79$^b$ which will cause the entire holder to be elevated thereby to receive an upper line of printing W$^3$. This upper line of printing will represent the reading of the type wheels when the cab returns and of course the totals of the various type wheel units will be higher. In that way, this line of figures constitutes a minuend from which the lower line of subtrahend or "Out" figures may be subtracted with facility so that the remainder may be placed in the spaces W$^4$ provided for each of the type wheel units. It will of course be understood that the remainder placed in each of the spaces W$^4$ on the ticket is the result of the subtraction of the "Out" figures from the "In" figures by the checker or superintendent, and in order to determine how much money is due from the operator of the cab the money totals may be readily transferred to the money chart W$^5$ printed on the record card to the left of the meter record.

For example, referring to Fig. 20 it will be assumed that the meter is set to operate on an initial charge of 15¢ and 5¢ for each subsequent fraction of a mile according to the rate.

The card will show, by subtracting the lower line of figures W$^2$ from the upper line W$^3$ that while the cab was out the driver operated the cab once, with the flag in the wrong position. The "paid mileage" unit will show that the cab was run for one hundred and forty-four paid fractional miles, while the "total mileage" space will show that the cab cruised a total of two hundred and thirty-two fractional miles in order to earn its fare. During the earning period the extras drum was operated twice and from the "units" space it will be observed that the drop lever D—E was operated two hundred and forty-two times due to the moving of the vehicle or actuation by the clock. Also the "trip" space will show that the driver made sixteen trips, and turned his flag through sixteen complete cycles.

Therefore, from the money chart W⁵, the amount due the driver from trips as well as the fractions of a mile travelled beyond the initial fare, which is accounted for by the "trips" unit, will be shown and the amount due from that source computed. Also the extra fares may be ascertained as shown on the chart W⁵ to determine the total "extras" cash fare due. Also the card may be provided with the identification indicia shown at the left hand side of Fig. 20.

The "paid mileage" type wheels record all paid mileage in fractions of a mile, for example ¼ miles, ⅛ miles or however the cams are designed and this total includes the combined totals of the "units" and the "trips".

From the foregoing it will be apparent that one of the features of the invention resides in the provision of a printing unit which is constructed to receive a card having indicia and allotted spaces for receiving data of the performance of the cab, the first insertion and printing of the ticket receiving the starting data, and the subsequent insertion and printing receiving the finishing data in such a way that the checking up of the receipts from the driver requires only a few minutes. In that way the driver will know immediately after each run what he must turn in and the owner of the cab will have a complete record of not only the cash transactions involved but the paid as well as total miles that the cab has turned in, etc.

The detector type wheel unit

The detector type wheel unit designated generally as N, (see Fig. 4) consists as previously indicated, of two type wheels adapted to register, in fractions of a mile, the distance that the cab has been operated with the flag in an improper position. By an improper position is meant a point between the "flag up" or zero position and approximately the 40° position in going flag down, and between the 320° position and 360° or zero position going flag up. In other words in the space of approximately 40° from and toward the zero or flag up position the various instrumentalities of the meter are either connected or disconnected, and, therefore, the said instrumentalities will not work properly, and it is necessary to check up the driver on that point to make sure that he does not attempt to run his cab fraudulently.

The two type wheels 81 and 82 constituting the unit N are of the ordinary carry-over registering type and instead of having reading numerals thereon are provided with embossed type numerals to permit of the desired printed record being obtained. Therefore, it is necessary to only actuate the first type wheel of the series, or the wheel of lowest value, and at each revolution it will pick up the adjoining type wheel 82 in the well known manner.

With reference to the means for operating the type wheel 81 of lowest value of the unit N reference may be made to Figs. 12, 13 and 14 wherein the driving means A is shown in conjunction with the flag shaft 9.

The driving means A includes a spindle 83 adapted to be connected with the flexible cable leading to the vehicle wheel and having associated therewith a worm 84 meshing with a gear 85 carried by a hub 86 which is keyed to the secondary cam shaft 87 of the meter. Thus, the shaft 87 rotates continuously while the cab is being driven. Associated with the hub 86 on which the gear 85 is mounted is a sliding clutch member comprising a clutch collar 88 and clutch member 89. The clutch collar 88 is engaged by a clutch yoke formed at the end of a lever 90, the said lever being fulcrumed on the support 91 and having its upper end 92 resting upon the zenith of the cam projection 93 of cam 94 shown in Fig. 12, when the flag is in the upright or zero position. As will be observed from Fig. 12 the cam 94 is cut away at each side of the cam projection 93 as indicated at 95, the cut away portions or notches representing the part of the cycle of the flag when the meter instrumentalities are becoming engaged or disengaged, as previously indicated.

When the nose 92 of the lever 90 falls into one of the notches 95, the spring 96 connected with the yoke end of the lever, and also with the meter frame, will throw the clutch collar 88 so that the clutch face 89 will engage with the clutch face 97 of the detector operating cam 98. The detector operating cam is of course loosely mounted on the shaft 87, and only operates when the flag is moving through either the early first or near last of its cycle. If the driver of the cab moves his flag continuously from the zero or upright position to the 90° position, and likewise continuously from the 270° position back to 360°, it will be apparent that the detector operating cam 98 will not be rotated because there will be only a temporary engaging and disengaging of the clutch faces 89 and 87. However, should the meter be operated by the running of the vehicle while the nose 42 of the lever 90 was in either of the notches 95, the cam 98 would be operated.

The operation of the cam 98 will be shown on the type wheels 81 and 82 through the medium of the lever 99 shown in Fig. 14. The lever 99 may be pivoted as at 100 to the frame of the meter and has the pendant arm portion 101 adapted to be engaged by spring 102 to press the nose 103 at the intermediate part of the arm into engagement with the teeth of the cam 98. The forward extremity of the lever 99 carries therewith a pawl 104 which is pressed forwardly by the spring 105 so that the front end of the pawl will engage with the ratchet teeth 106 of the first type wheel 81.

With the arrangement described it will be apparent that the oscillation of the lever 99 under the influence of the cam 98, and against the tension of the spring 102 will cause the operation of the type wheel unit N for registering the mileage of the cab with the flag of the meter in an improper position.

*Paid mileage type wheel unit*

The paid mileage type wheel unit O consists of four type wheels, the one of lowest value being operated through the medium of a pawl and ratchet about to be described, and the carry-over from one wheel to the other being of the usual type so that it is unnecessary to describe the same here. The type wheels of course, all contain embossed printing figures, and as will be observed from Fig. 4 the ratchet on the wheel of lowest value is designated as 107 adapted to be engaged by a pawl 108 (Fig. 15) carried by lever 109 operated by the cam 110 loosely journaled on the secondary cam shaft 87.

As the specific means for operating the ratchets of the type wheels of lowest value of the units N, O and P are duplicated for purposes of manufacturing economy and assembling, the specific construction of the pawls and levers in connection with the description of the means for operating the detector type wheels will apply and reference now will only be made to the manner of imparting motion to the lever 109 by the cam 110.

The cam 110 is provided with a hub 111 (Fig. 12) having a clutch face adapted to engage with a clutch face 112 on a clutch collar 113 slidably keyed with the hub 114 of the total miles cam 115, said cam being keyed to the shaft 87. The clutch collar 113 is adapted to be shifted to cause clutch faces 111 and 112 to engage all while the flag of the meter is in one of the tariff positions, thereby to show the number of paid miles for which the cab has been operated, and the means for shifting this clutch collar into and out of engagement with the paid miles cam 110 is the angular lever 116. The yoke portion of the lever 116 which engages with the collar 113 is engaged by a spring 117, and the intermediate portion of said lever is fulcrumed on the support 91 while the upper end 118 thereof (see Fig. 12) is intended to rest upon the outer extremity of the cam projection 93 when the flag is in the vertical or "For hire" position. Fig. 12 shows the position of the lever 116 with the flag as indicated, but when the flag and the flag shaft 9 which carries the cam 93—94 is moved to one of the tariff positions, it will be clear that the end 118 of the lever drops off of the cam projection 93, and remains out of engagement therewith until the flag again returns to the vertical or "For hire" position at the end of the trip.

Accordingly, it will be apparent that while the flag is in any of the fare earning positions the miles which are being paid for will be registered on the type wheels of the "paid mileage" printing unit O.

*Total mileage type wheel unit*

The total mileage printing type wheel unit P consists of four type wheels each having embossed printing letters thereon, the wheel of lowest value being provided with a ratchet 119 operated by the spring-pressed pawl 120 carried by the spring tensioned lever 121 shown in Fig. 16.

The lever 121 is operated by the total miles cam 115 which is keyed to the shaft 87 as previously indicated. Therefore, since the shaft 87 runs continuously while the cab is in motion, the total miles cam 115 will register in quarter miles for example the number of miles that the cab runs, the total including paid as well as unpaid miles so that the owner of the cab can check up on the mileage of tires and the wear and tear on the cab in general.

*Extras printing type wheel unit*

The extras printing type wheel unit Q consists of three type wheels, all having embossed type numerals thereon, and the wheel of lowest value having thereon a ratchet 122 (Fig. 17) adapted to be engaged by a spring pressed pawl 123 pivotally carried as at 124 by the extension 125 of the extras operating lever 126. The extras operating lever 126 is pivotally supported at 127 and carries therewith an actuating pawl 128, the same forming a part of the extras mechanism designated generally as M and including the extras fare drum 129 (see Fig. 12).

The extras operating lever 126 has an extension 126ᵃ engaging with a lever 126ᵇ pivoted to the back of the meter and is rocked on its pivot 127 by the manipulation of the extras printing knob 7 shown on the back of the meter in Fig. 2. These connections are fully illustrated and claimed in our copending application filed of even date herewith and will not be further referred to here. The oscillation of the extension 125 of the lever 126 will cause the operation of the pawl 123 so that each time an extra is rung up by the driver of the cab operating the knob 7, the type wheel of lowest value will show that the extras mechanism has been operated. The type wheel unit does not print the value of the extras in dollars and cents, but is merely intended to print the number of times that the extras drum has been moved forward, so that the rate of extras being known it is only necessary to multiply the rate by the number of times that the extras fare drum has been advanced to obtain the total amount of cash for "extras" due from the driver of the cab. This amount is calculated and placed in the chart W⁵ on the record card W' as shown in Fig. 20.

Units printing type wheel unit

The "units" type wheel printing set or unit, designated generally as R comprises four type wheels with embossed type thereon and the wheel of lowest value having thereon the ratchet 130, see Fig. 18.

The purpose of the set of type wheels R is to record the number of units registered on the fare drums, and by that is meant the number of times that the units drum is advanced one numeral to register the unit of initial charge. If the meter is a so-called 5¢ meter, that is a meter on which the subsequent rate of charge is 5¢ per fraction of a mile after the initial charge, then the type wheels of the said unit R will register the multiples of 5¢ which are due from the driver for paid fractions of a mile in excess of the mileage given for the initial charge which may be 15¢ for the first two-thirds of a mile, for example. The initial charge does not register in the totals accumulated on the type wheels of the unit R because on the initial charge, the lever D—E is held out of action. Therefore, the initial charges are computed from the "trips" type wheels which will be presently described.

Referring to Fig. 18 which shows the drop lever D—E, and the means for operating the ratchet 130 of the type wheel of lowest value in unit R, it will be observed that the said ratchet is directly engaged by a spring-pressed pawl 131 carried by the angular arm 131ᵃ pivotally mounted as at 132 on the end of bracket arm 133. This arm is provided with the upwardly extending forked arm 134 adapted to receive the stud 135 of an operating member 136 mounted on the shaft 137 which is the same shaft on which the angular lever E is mounted. Any rocking movement imparted to the lever E by the lever D will of course be communicated to the shaft 137 and in turn to the arm 136, thereby actuating the pawl 131 through the medium of the member 131ᵃ and pawl 131.

Thus with the foregoing arrangement it will be apparent that each time a unit of fare is registered on the fare drums, the same will be recorded on the type wheels of the set R.

Trip type wheel printing unit

The trip type wheel unit designated generally as S includes three type wheels with embossed type thereon, and as usual the wheel of lowest value is provided with a ten-tooth ratchet 138 which is moved forward one numeral each time the flag shaft 9 makes a complete cycle.

The type wheel unit S is shown in Fig. 4 and the ratchet and operating connections therefor are shown in Fig. 19.

As previously indicated the main cam shaft G of the meter is operated by the flag shaft 9 in direct ratio by the gears 10 and 11, and therefore the said main cam shaft G may be conveniently utilized to register each trip of the cab which will manifest itself in the meter by a fresh completion of the cycle of the cam shaft.

Any suitable cam means may be utilized on the cam shaft for operating the trip counter actuating connections, but as will be observed from Fig. 19 one of the resetting cams for the fare drums, namely the cam 139 is provided with an offset lug or pin 140, which in the flag up position rests against the upper end 141 of a main actuating lever 142. This lever 142 is pivotally supported at its medial portion by the fulcrum member 143 and is pulled by the spring 144 toward the lug 140. The lower end of a lever 142 carries a spring pressed pawl 145 which is adapted to engage with the ratchet 138 of the type wheel.

The position of the parts shown in Fig. 19 is the "flag up" position, and when the cab starts on its run the flag is moved downward into one of the tariff positions, whereupon the pin 140 moves away from the end of the lever 142 and the spring 144 actuates the lever once, and in turn the type wheel of lowest value of the set comprising the unit is moved forward one numeral. When the flag is turned back to the upright or "For hire" position the lever 142 is again moved back to the position shown in Fig. 19.

Summary

From the foregoing it will be apparent that the present invention provides a printing construction which permits of the printing of an insertable and removable record card by manually operated means entirely independent of the flag, thus distinguishing from record printing meters wherein complicated and much unnecessary mechanism is used to compel the flag to control the printing instrumentalities.

Furthermore the novel card receiving and holding means and the manner in which it is manipulated to print two rows of figures on a card in such a way as to facilitate the subtraction of one line of figures from the other provides a record that greatly facilitates the transaction of the business between the owner and the driver of the cab.

Without further description it is thought that the features and advantages of the invention will be readily apparent to those skilled in the art, and it will of course be understood that changes in the form, proportion and minor details of construction may be resorted to, without departing from the spirit of the invention or scope of the appended claims.

We claim:—

1. A printing taximeter including type elements, impression means including a frame, cam shafts journaled in said frame, a plurality of individual impression platens mounted in the frame and operated by said cam shafts, gearing connecting said cam shafts with a central driving gear, a record card holder between the impression means and the type elements, and means for manually operating said central driving gear of said gearing to simultaneously actuate said individual platens.

2. A printing taximeter including type elements, impression means including a plurality of individual impression platens for the type elements, said platens comprising a type striking body, a lever to which said striking body is pivotally attached, a spring for holding said striking body in a normally retracted position, a spring for tensioning said lever, a cam for placing said lever under the influence of the tension of said spring and suddenly releasing the same whereby the striking platen is thrust forwardly toward the type wheels and beyond the plane of the front edge of the lever to which the striking body is attached, and means for receiving a record card between the type elements and the impression means.

3. A printing taximeter including type elements, impression means including a frame, shafts journaled in said frame, a plurality of cams on said shafts, a plurality of individual impression platens for said type elements, each platen including a pivotally supported lever having one arm adapted to be engaged by a cam on one of said cam shafts, a striking body pivotally connected to the other arm of said lever, an abutment also on the arm of the lever to which the striking body is pivoted, a spring for holding said striking body normally in a retracted position against said abutment, springs for connecting the ends of the cam engaging arms of the levers of oppositely arranged impression platens, manually operated means for actuating said cam shafts, and a record card adapted to be inserted between the impression means and the type elements.

4. A printing taximeter including in combination with the back wall of the meter provided with an opening, a frame supported in the wall at said opening, a plurality of type elements mounted in said frame, an inked ribbon mounted in said frame to move in front of said type wheel units, impression means including a plurality of impression platens for said type elements, shafts having cams for operating said impression platens, means including reduction gearing operated from one of said shafts for feeding said inked ribbon, a record card holder arranged between the surface of the type elements covered by the inked ribbon and the impression mechanism adapted to receive a removable record card, and means for manually operating said impression means.

5. A printing taximeter including in combination with the back wall of the meter provided with an opening, a frame mounted in said opening, a plurality of type elements carried by said frame, impression means including a frame and individual impression platens mounted on the back wall of the meter, an inked ribbon mounted on the frame carrying the type wheels and carried by an idler roller and taken up by a feed roller, a gear connected to the feed roller by a clutch, gearing carried by the side of the frame of the impression means and operated by said means, and said gearing including a gear adapted to mesh with the gear connected with the feed roller for the inked ribbon.

In testimony whereof we hereunto affix our signatures.

JULIUS GLUCK.
RUDOLF R. KARICH.